No. 878,567. PATENTED FEB. 11, 1908.
G. B. SHOWALTER.
WAGON BRAKE.
APPLICATION FILED APR. 11, 1907.
3 SHEETS—SHEET 2.
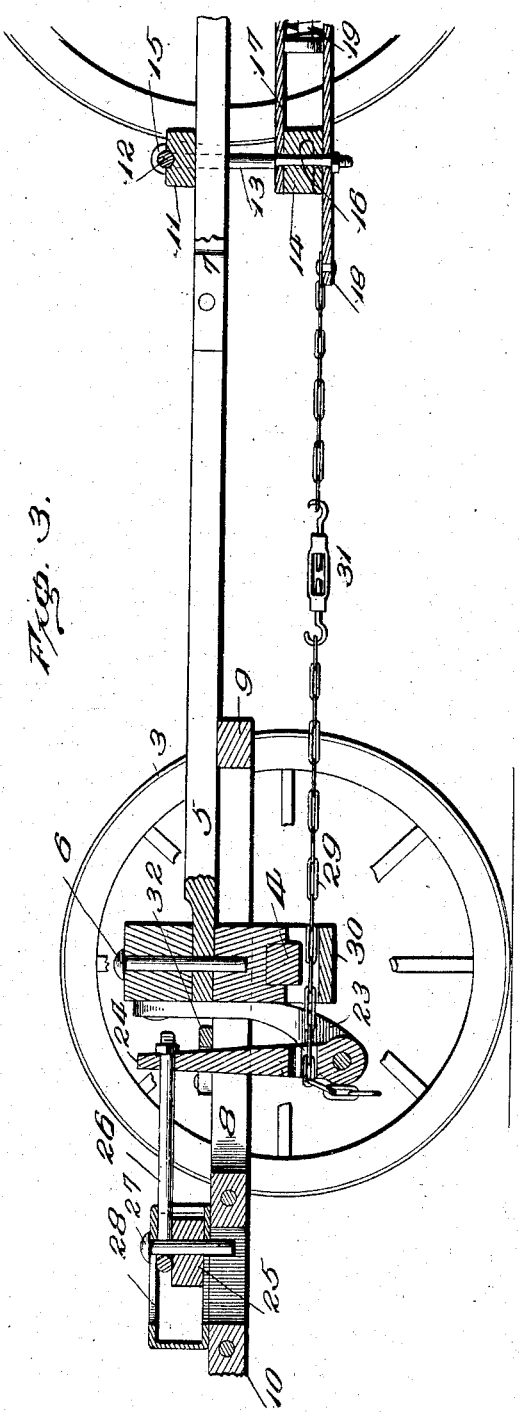
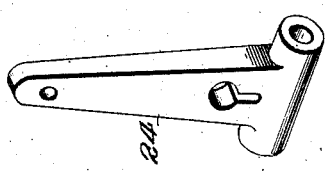
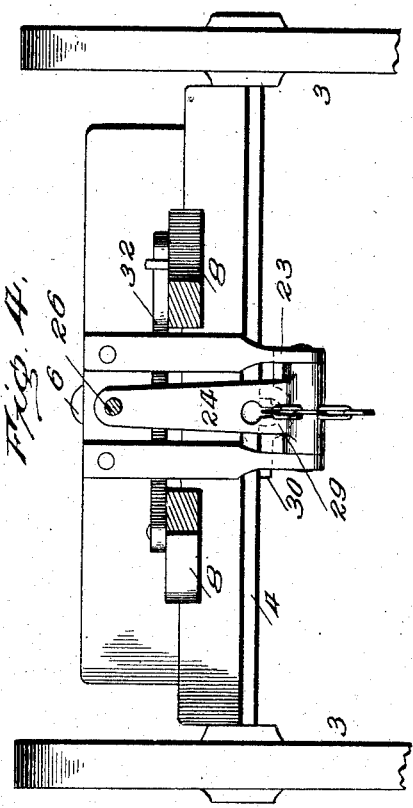
Witnesses
Inventor
George B. Showalter.
By R. H. A. P. Lacey,
Attorneys No. 878,567. PATENTED FEB. 11, 1908.
G. B. SHOWALTER.
WAGON BRAKE.
APPLICATION FILED APR. 11, 1907.
3 SHEETS—SHEET 3.
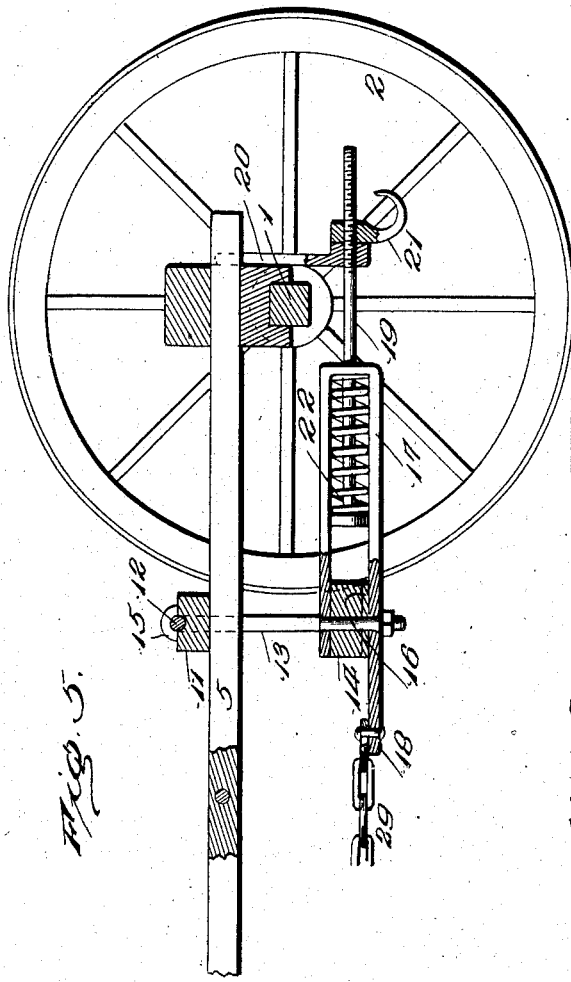
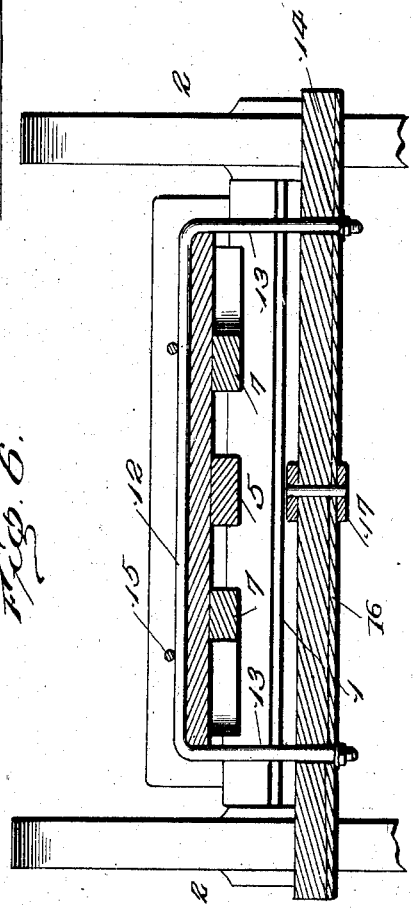
Witnesses
Inventor
George B. Showalter.
By R. A. P. Lacey,
Attorneys

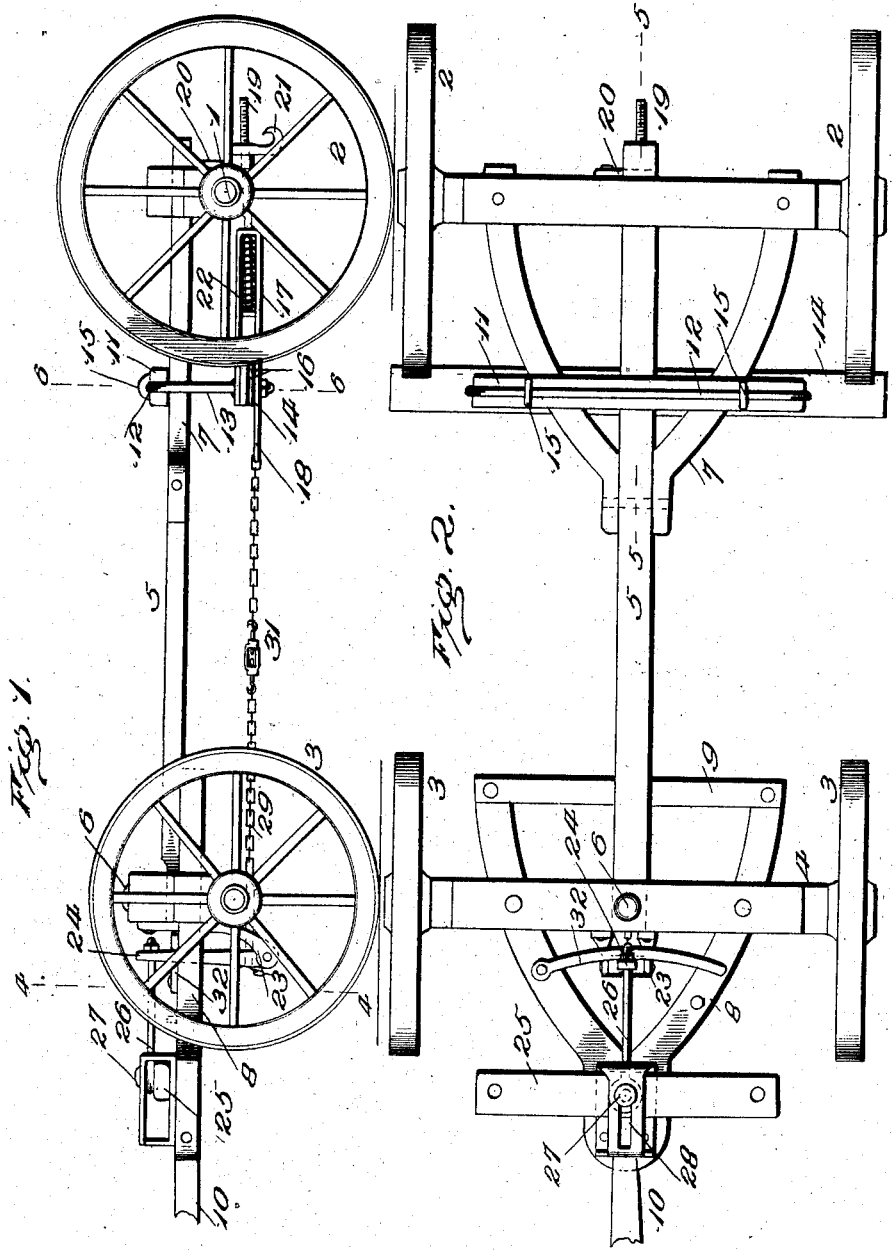

UNITED STATES PATENT OFFICE.

GEORGE B. SHOWALTER, OF BROADWAY, VIRGINIA.

WAGON-BRAKE.

No. 878,567.	Specification of Letters Patent.	Patented Feb. 11, 1908.

Application filed April 11, 1907. Serial No. 367,720.

*To all whom it may concern:*

Be it known that I, GEORGE B. SHOWALTER, citizen of the United States, residing at Broadway, in the county of Rockingham and State of Virginia, have invented certain new and useful Improvements in Wagon-Brakes, of which the following is a specification.

The present invention relates to improvements in vehicles and more particularly to a novel brake of that type which are peculiarly designed so as to be automatically applied when the team is backing or ceases to exert a forward pull.

One of the objects of the invention is to design a simple and comparatively inexpensive brake which can be readily applied to the running gear of a wagon.

The invention also aims to provide a novel means whereby the brake can be removed from the influence of the team when desired, and also for preventing the turning of the front axle from interfering with the connection between the double-tree and the brake beam.

For a full understanding of the invention and the merits thereof and also to acquire a knowledge of the details of construction of the means for effecting the result, reference is to be had to the following description and accompanying drawings, in which:

Figure 1 is a side elevation of a vehicle running gear having the improved brake mechanism applied thereto; Fig. 2 is a top plan view of the same; Fig. 3 is a longitudinal sectional view; Fig. 4 is a section on the line 4—4 of Fig. 1; Fig. 5 is a section on the line 5—5 of Fig. 2; Fig. 6 is a section on the line 6—6 of Fig. 1; and, Fig. 7 is a detail view showing the method of connecting the chain to the lever at the forward portion of the running gear.

Corresponding and like parts are referred to in the following description and indicated in all the views of the drawings by the same reference characters.

The invention is shown as applied to a running gear of the usual construction comprising the rear axle 1 having the rear wheels 2 mounted thereon, and the front axle 4 having the front wheels 3 mounted thereon, the said axles being connected by the reach 5 which is rigidly secured to the rear axle 1 and pivotally connected to the front axle 4 by means of the king-bolt 6. Projecting forwardly from the end portions of the rear axle 1 are the rear hounds 7 which have their forward ends converged inwardly and secured to the reach 5 in the usual manner. The front hounds 8 have intermediate portions thereof connected to the front axle, the rear ends of the front hounds being joined by a cross bar 9 which extends under the reach, while the forward ends extend inwardly and are secured to the tongue 10. Mounted upon the upper face of the reach 5 and the rear hounds 7 is a transverse bar 11 carrying the shaft 12 having the ends thereof extended downwardly to form the hangers 13 which support the brake beam 14. In the present instance the shaft and hangers are formed form a single length of material and the shaft is loosely mounted upon the transverse bar 11 by means of the staples 15.

A metallic plate 16 is fastened to the lower face of the brake beam 14 and serves to stiffen the same against lateral bending. Pivotally connected to an intermediate portion of the brake beam 14 and extending rearwardly therefrom is a clevis 17, one of the arms of which projects forwardly as indicated at 18. A rod 19 passes loosely through the end of the clevis 17 and the head of the rod is designed to move freely between the two arms of the clevis. The rear end of the rod 19 extends through a bracket 20 pendent from the rear axle 1 and is threaded for the reception of a nut 21 which is preferably provided with a laterally extending finger piece as shown in the drawings. Interposed between the head of the rod 19 and the end of the clevis 17 is a coil spring 22 which normally operates to swing the brake beam rearwardly into engagement with the rear wheels 2.

It will be readily apparent that with the foregoing construction, the tension in the coil spring 22 and the force with which the brake will be applied can be readily regulated by proper manipulation of the nut 21.

A bracket 23 projects downwardly from the front axles 4 and the said bracket comprises a pair of spaced arms having the lower end of the lever 24 pivotally mounted between the extremities thereof. This lever 24 extends upwardly between the front hounds 8 and is connected to the whiffletree 25 through the medium of the rod 26. The bolt 27 upon which the whiffletree 25 is pivoted is slidably mounted within a guide member 28 comprising upper and lower spaced sides connected by end portions, the said spaced sides being formed with corresponding slots receiving the said bolt 27. This guide member 28 is secured to the front hounds and the tongue and serves to reinforce the connection between the same.

The forwardly projecting portion of the clevis 17 is connected to the lower portion of the lever 24 by means of a chain or tension member 29 which extends through a keeper 30 secured to the front axle 4. This keeper 30 serves to take up the slack when the front axle is swung upon the king-bolt in making a turn and thereby prevents the brake beam from being drawn against the rear wheels. In order to enable compensation to be readily made for wear in the various members, a turn-buckle 31 may be located intermediate of the tension member 29 whereby the latter can be lengthened or shortened as required. In connecting the forward end of the chain 29 to the lever 24, it will be observed that the latter is formed with a key hole slot 33, the chain being passed through the enlarged portion of the key hole slot and adjusted to the required length, and then slipped into the contracted portion of the slot where it is securely locked against longitudinal slipping. Provision is also made for removing the brake from the influence of the draft animals, and for this purpose, a cross-piece or lever 32 is employed which is pivotally connected to one of the forward hounds and is designed to engage a projection upon the opposite hound, or be otherwise detachably connected to the latter. This lever 32 is designed to engage the upper end of the before mentioned lever 24 and to hold the same in a forward position where the brake beam is held out of engagement with the wheels. When the lever 32 is not applied, it will be readily apparent that the spring 22 will normally operate to draw the brake beam against the rear wheels, but that as soon as any forward pull is exerted upon the whiffletree, the bolt 27 will move forwardly within the guide member and operate through the medium of the lever 24 of the tension member 29 to draw the brake beam away from the wheels.

Having thus described the invention, what is claimed as new is:

1. The combination of a running gear comprising spaced hounds, a brake mechanism mounted upon the running gear, a lever mounted upon the running gear and extending between the spaced hounds, connecting means between the lever and brake mechanism, means for applying draft to the lever, and a cross piece connecting the hounds and adapted to engage the lever to hold the brake mechanism in an inoperative position.

2. The combination of a running gear comprising spaced hounds, a brake mechanism mounted upon the running gear, a lever pivotally mounted upon the running gear and extending between the spaced hounds, the said lever being provided with a key hole slot, a tension member connecting the brake mechanism and the lever and adjustably engaging the key hole slot, means for applying draft to the lever, and a locking member mounted upon the hounds and engaging the lever to hold the brake mechanism in an inoperative position.

3. The combination of a running gear, comprising a front axle having a pair of spaced hounds applied thereto, a brake mechanism mounted upon the running gear, means normally holding the brake mechanism in an operative position, a whiffletree applied to the running gear, a lever carried by the front axle and extending between the spaced hounds, connecting means between the lever and the brake mechanism, connecting means between the lever and the whiffletree, and a second lever pivotally connected to one of the hounds and having a detachable connection with the opposite hound, the said lever being designed to engage the first mentioned lever to remove the brake mechanism from the control of the whiffletree.

4. The combination of a running gear, a brake beam suspended from the running gear, a whiffletree applied to the running gear, connecting means between the whiffletree and brake beam, a clevis embracing the brake beam and extending rearwardly therefrom, a bracket carried by the rear axle, a rod connected to the bracket and passing loosely through the end of the clevis, and a spring interposed between the end of the clevis and the extremity of the rod, the said spring operating to hold the brake beam normally in an operative position.

5. The combination of a running gear comprising front and rear axles connected by a reach and the rear axle and reach being provided with rear hounds, a transverse bar applied to the reach and rear hounds, a shaft loosely mounted upon the transverse bar and having the ends thereof extending downwardly to form hangers, a brake beam carried by the hangers, a clevis embracing the brake beam and extending rearwardly therefrom, a bracket applied to the rear axle, a rod connected to the bracket and having a sliding connection with the clevis, a spring coöperating with the rod and clevis to hold the brake beam normally in an operative position, a whiffletree applied to the running gear, and connecting means between the whiffletree and the brake beam.

6. The combination of a running gear, a brake beam suspended from the running gear, a clevis embracing the brake beam and extending rearwardly therefrom, one arm of the clevis projecting forwardly from the brake beam, a bracket applied to the rear axle, a rod connecting the bracket and having a yielding connection with the clevis, a lever pivotally mounted upon the forward portion of the running gear, connecting means between the lever and the forward extending arm of the clevis, and means for applying the draft to the lever.

In testimony whereof I affix my signature in presence of two witnesses.

GEORGE B. SHOWALTER.

Witnesses:
F. C. HEDHIZER,
W. H. HAWKINS.